United States Patent [19]

Lövgren

[11] 4,208,160
[45] Jun. 17, 1980

[54] DEVICE FOR TRANSFERRING LOAD UNITS

[76] Inventor: Sten Lövgren, Amanuensvägen 10/206, S-104 05 Stockholm, Sweden

[21] Appl. No.: 857,665

[22] Filed: Dec. 5, 1977

[30] Foreign Application Priority Data

Dec. 13, 1976 [SE] Sweden ................................ 7613978

[51] Int. Cl.$^2$ ................................................ B60P 1/00
[52] U.S. Cl. ...................................... 414/347; 414/401
[58] Field of Search ............ 214/38 B, 38 BA, 38 BB, 214/38 C, 38 CC, 515, 516, 730, 731; 414/340, 347, 352, 392, 396, 399, 401, 499

[56] References Cited

U.S. PATENT DOCUMENTS

| | | | |
|---|---|---|---|
| 1,306,158 | 6/1919 | Walker | 214/38 CC |
| 2,760,270 | 8/1956 | Sims | 214/38 BB |
| 3,252,608 | 5/1966 | Proler | 214/38 C X |
| 3,437,219 | 4/1969 | Stevenson | 214/38 B |
| 3,765,692 | 10/1973 | Barber et al. | 214/38 BA X |
| 4,077,535 | 3/1978 | Oriol | 214/515 |

Primary Examiner—Robert G. Sheridan
Attorney, Agent, or Firm—Browdy and Neimark

[57] ABSTRACT

A device for transferring load units comprises a transfer apparatus for transferring such load units in an elevated condition between first and second carriers each having at least two upwardly open channels extending transversely to the longitudinal direction thereof, the channels being bridged by the load units when located on the carriers, the transfer apparatus being arranged on the second carrier and comprising at least two separate arms each having lifting devices and being displaceable from the channels of the second carrier to the channels of the first carrier and vice versa transversely to the longitudinal direction of the carriers, the channels of the second carrier housing the arms when inactive. Loading platforms for the load units formed by supporting chassis of the carriers each comprises a plurality of partial loading platforms, the partial loading platforms on each of the carriers being located between and beside the channels recessed into the chassis and being rectangular as viewed from above, each of the partial loading platforms being formed by chassis portions extending on one hand in the longitudinal direction of the chassis between the sides of adjacent channels or between the ends of the chassis and the sides of the channels located adjacent thereto, and on the other transversely of the longitudinal direction of the chassis from one longitudinal side of the chassis to the other. Each of the transfer arms is provided with its own separate operating mechanism for individually performing the displacement of the arm between the channels of the carriers.

5 Claims, 11 Drawing Figures

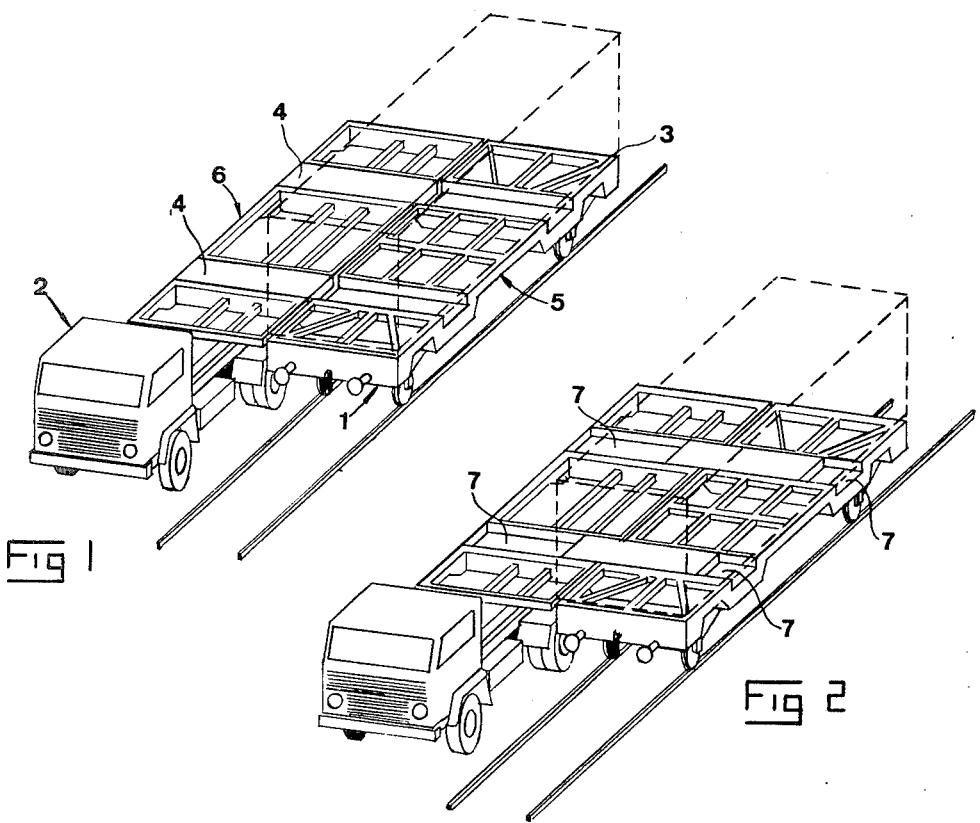
Fig 1
Fig 2
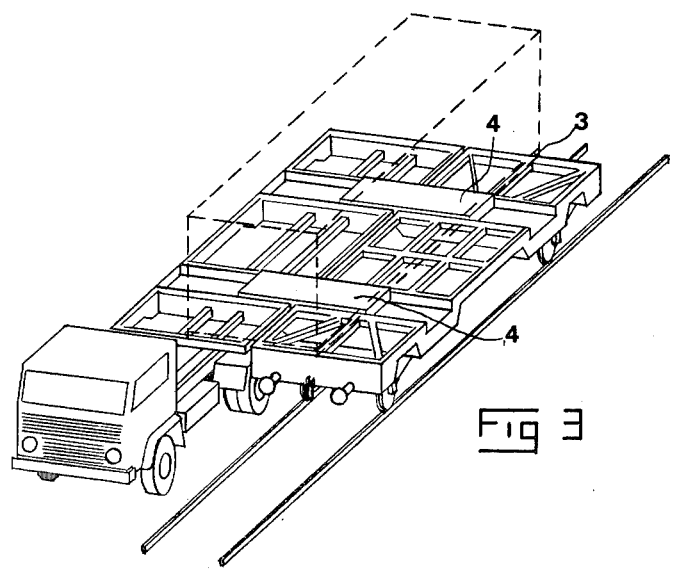
Fig 3

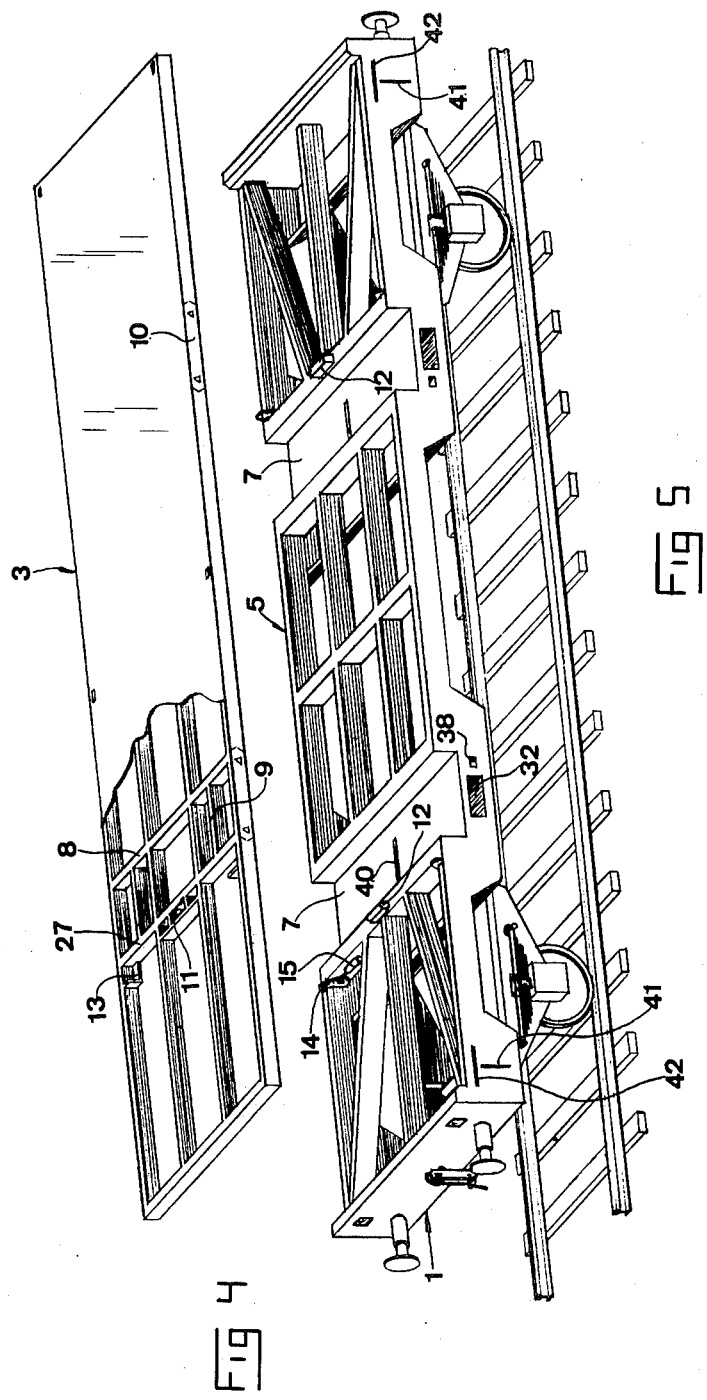

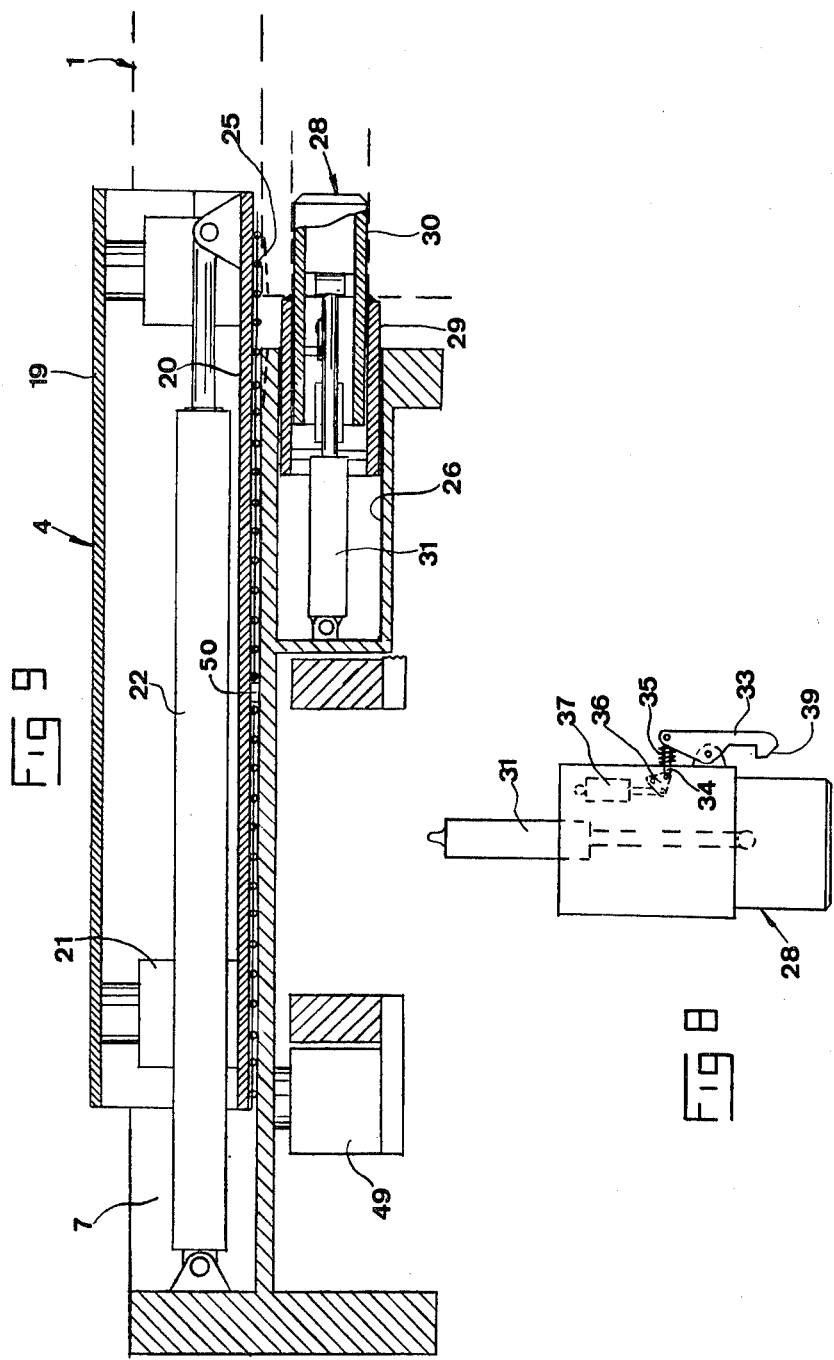

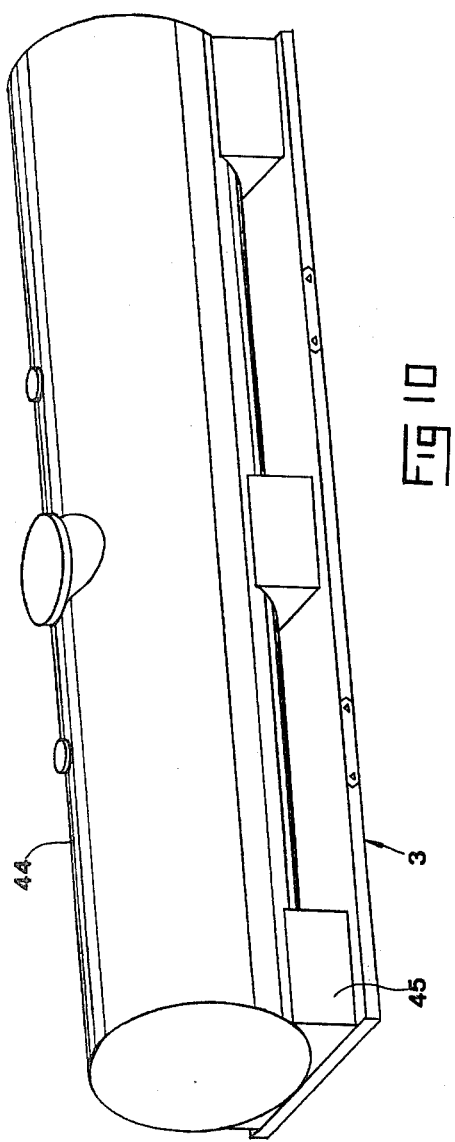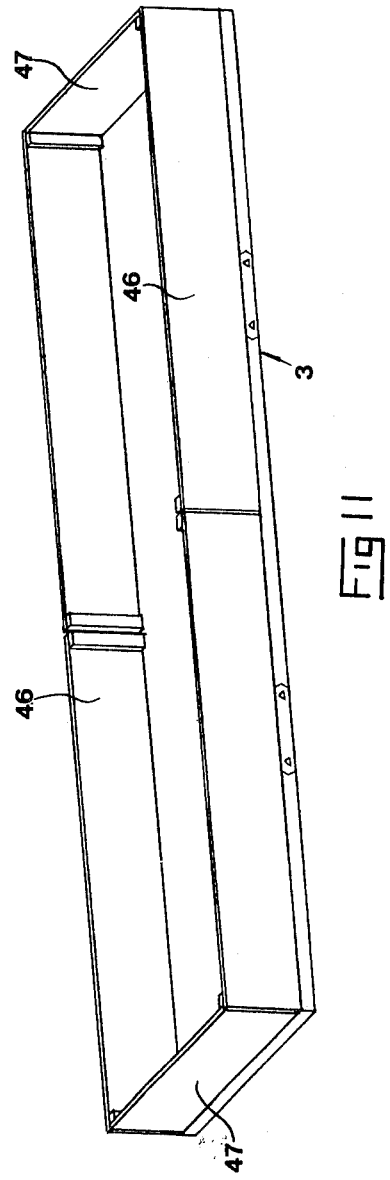

DEVICE FOR TRANSFERRING LOAD UNITS

This invention relates to a device for handling load units, comprising a transfer apparatus for transferring said load units in an elevated condition between first and second carriers, said carriers having at least two upwardly open channels extending transversely to the longitudinal direction of said carriers, said channels being bridged by said load units when located on the carriers, said transfer apparatus being arranged on said second carrier and, comprising at least two separate arms each having lifting means and being displaceable from the channels of said second carrier to the channels of said first carrier and vice versa transversely to the longitudinal direction of said carriers, said channels of said second carrier housing the arms when inactive.

Devices of the kind indicated are known by e.g. the U.S. patent specification 2 854 158.

However, these known devices suffer from several disadvantages, the most severe of which is the incapability of transferring and supporting load units of very different sizes in an efficient manner.

The object of the invention is to remove the abovementioned and other drawbacks and provide an efficiently operating device.

This object is achieved in that loading platforms for the load units formed by supporting chassis of the carriers each comprises a plurality of partial loading platforms, said partial loading platforms on each of the carriers being located between and beside the channels recessed into said chassis and being rectangular as viewed from above, each of said partial loading platforms being formed by chassis portions extending on one hand in the longitudinal direction of the chassis between the sides of adjacent channels or between the ends of the chassis and the sides of the channels located adjacent thereto, and on the other transversely of the longitudinal direction of the chassis from one longitudinal side of the chassis to the other, and in that each of said transfer arms is provided with its own separate operating mechanism for individually performing the displacement of said arm between the channels of the carriers.

With reference to the appended drawings, a more specific description of an embodiment of the invention will follow hereinafter. In the drawings:

FIGS. 1-3 are perspective views illustrating the invention during three stages of transfer of a load unit;

FIG. 4 is a partially cut perspective view of a load support;

FIG. 5 is a perspective view of a railroad car;

FIG. 8 is a view of a stabilizer bar illustrated in FIG. 7;

FIG. 9 is a section along line 9—9 in FIG. 7; and

FIGS. 10 and 11 are perspective views illustrating two alternate arrangements on the supports.

Figure 6:
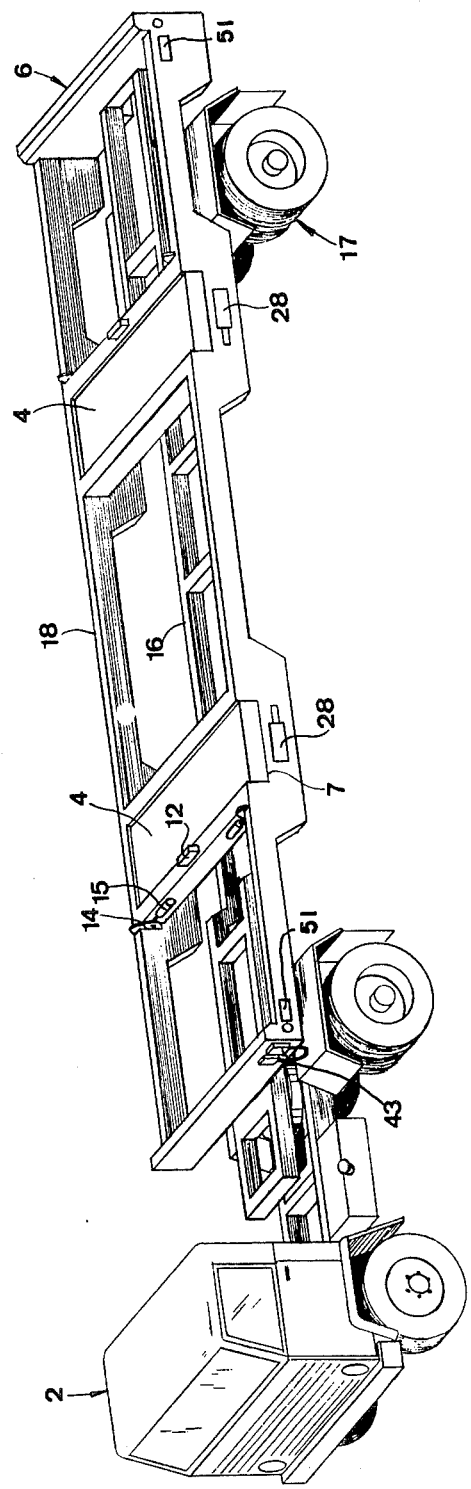
FIG. 6 is a perspective view of a truck.

In FIGS. 1-3, a first carrier in the form of a railroad car is denoted 1. A second carrier in the form of a truck 2 is located side by side with the railroad car so that longitudinal axes of the vehicles are essentially parallel. A load support 3 in the form of a platform-like structure is located on the railroad car in FIG. 1. Said support may be provided with four side walls and a roof as indicated with dashed lines. A transfer apparatus is provided on truck 2 and comprises two arms 4, which are displaceable perpendicularly to the longitudinal direction of said vehicle from the truck to the railroad car and then back to the truck. The vehicles 1 and 2 have chassis 5 and 6 each chassis is provided with two upwardly open channels 7 arranged to be bridged by support 3 when the same is positioned on said chassis. The distances between channels 7 of each vehicle 1, 2 are corresponding. Transfer arms 4 are displaceable within channels 7 from truck 2 to railroad car 1 and then back to truck 2. The arms 4 are associated with lifting means, which will be described hereinafter and by means of which support 3 may be elevated and transferred to the other vehicle in order to be lowered onto the chassis thereof. When inactive, arms 4 are arranged to be housed within channels 7 of chassis 6 of truck 2.

In FIG. 4, support 3 is shown in detail. The support consists of a self-carrying structure having two longitudinal side beams and two end beams and reinforcement beams extending between the end beams. The top side of support 3 is covered with metal sheet. In the areas of support 3, where the arms 4 are intended to abut in order to elevate the support, there are provided additional reinforcements in the form of transverse beams 27, 8 and beams 9 extending between said transverse beams and in longitudinal direction of the support. The underside of support 3 may be provided by metal sheet between beams 8, 27. For the rest, the underside of support 3 may be open downwardly. Couplings 10 may be provided in order to enable lifting of support 3 in a conventional manner by crane and cables or the like.

Support 3 has two recesses 11 (one of which appears in FIG. 4) adapted to receive projections 12 (FIGS. 5, 6) on railroad car 1 and truck 2 when lowering the support in order to hold the same in relation to the vehicle. The projections 12 may be tapered in order to simplify the insertion into recesses 11. Support 3 has four locking shoulders 13, two of which are arranged at each side. On railroad car 1 and truck 2, there are four hitches 14, which are spring-loaded to a locking position and pivotable in relation to said chassis and arranged to be pivoted away by the locking shoulders on support 3 in order to engage said locking shoulders while holding said support when the same is lowered onto the vehicle. Each hitch 14 is connected to a piston-cylinder mechanism 15 arranged to disengage hitch 14 whilst overcoming the spring force when support 3 is to be elevated. The spring loading may be provided by one or more springs arranged in piston-cylinder mechanism 15.

In FIG. 5, railroad car 1 is shown. It comprises a chassis 5 constructed of a frame having a plurality of reinforcing and supporting beams. The channels 7 for receiving transfer arms 4 are defined by planar vertical side walls and a planar horizontal bottom. When lowering support 3 onto railroad car 1, the support portion between reinforcement beams 8, 27 (FIG. 4) will lie over channel 7.

In FIG. 6, truck 2 is illustrated. Transfer arms 4 are shown in an inactive position in which they are housed within channels 7 of chassis 6 of truck 2.

It should be noted that loading platforms for support 3 formed by chassis 5, 6 of railroad car 1 and truck 2 each comprises three partial loading platforms, said partial loading platforms on each of the chassis being located between and beside the channels 7 recessed into said chassis and being rectangular as viewed from above, each of said partial loading platforms being formed by chassis portions extending on one hand in the longitudinal direction of the chassis between the sides of adjacent channels or between the ends of the chassis and the sides of the channels, and on the other transversely of the longitudinal direction of the chassis from one longitudinal side of the chassis to the other. The loading platform on each of the chasses 5, 6 is located in a horizontal plane and accordingly, the platforms may receive and support loads over their entire length. It should be noted that chassis 6 of truck 2 preferably may be completed by additional transverse beams extending parallel to the channels 7. The upper surfaces of the chassis 5, 6 may be covered by metal sheets interrupted by channels 7.

The chassis 6 of truck 2 comprises two parts 16, 18 (FIG. 6) movable vertically in relation to each other, namely a first base part 16, which has a rear wheel assembly 17 and a front coupling means for connection to the pulling unit of the truck, and a second upper, movable part 18 for receiving support 3, said channels 7 and arms 4 being arranged in part 18. Power means, such as piston-cylinder mechanisms 49 (FIG. 7), are provided between parts 16, 18 to adjust part 18 into a vertical position in relation to railroad car 1 suitable for transferring support 3.

Figure 7:
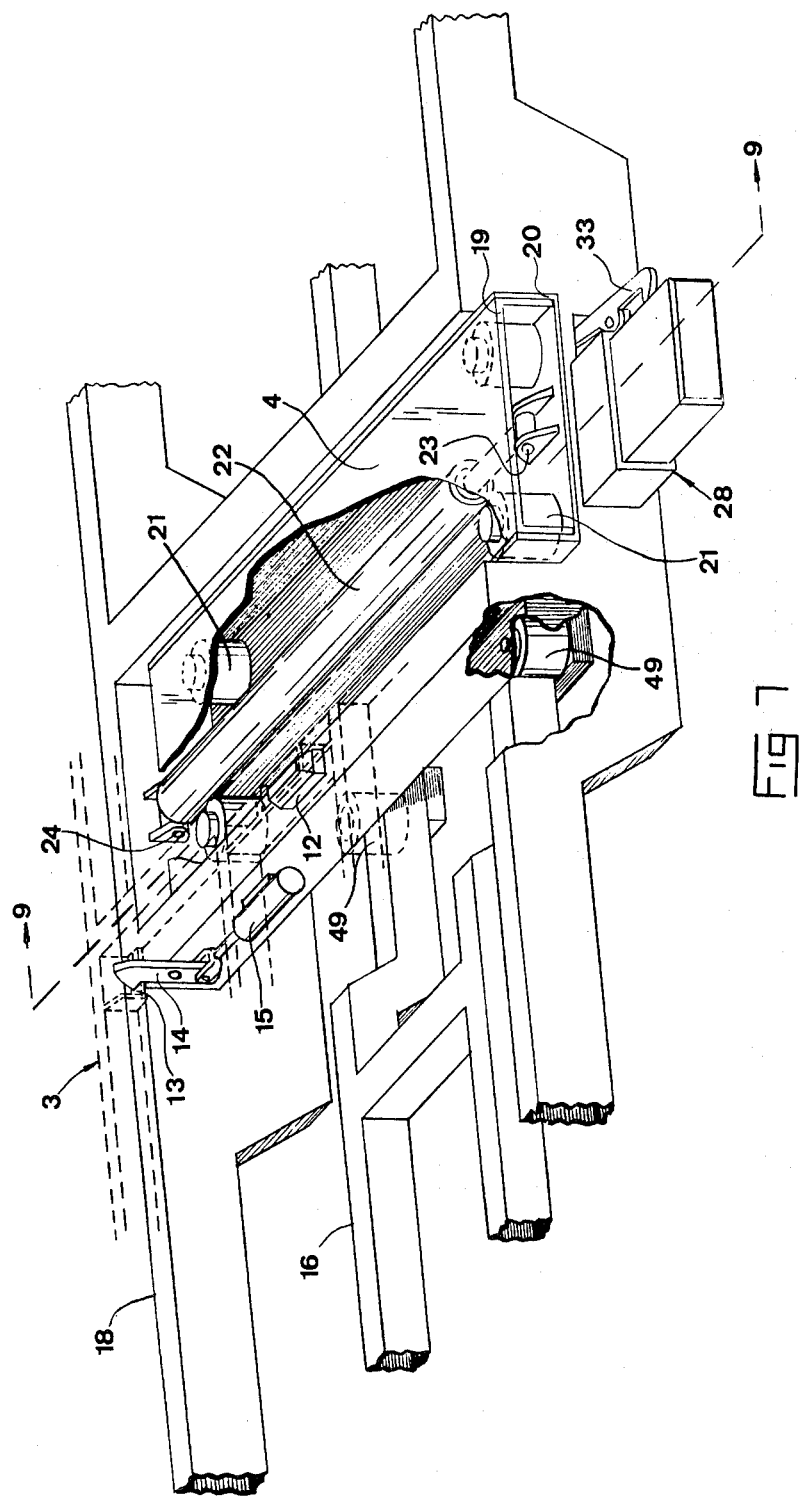
FIG. 7 is a partially cut perspective view in enlarged scale of the truck illustrated in FIG. 6.

FIG. 7 illustrates a limited portion of chassis 6 of truck 2, namely the area about the front channel 7. It should be noted that apart from the two illustrated piston-cylinder mechanisms 49 between chassis parts 16, 18 there are provided at least two additional piston-cylinder mechanisms at the rear portion of truck 2. The control of the pressure fluid supply to said piston-cylinder mechanism will be described hereinafter. From FIGS. 7, 9 it appears that arm 4 comprises two parts 19, 20, the upper 19 of which may be elevated and lowered in relation to the other lower part 20 by power means, such as piston-cylinder mechanisms 21. Parts 19, 20 consist of U-shaped beams having the flanges facing each other, the flanges of one beam being received between the flanges of the other beam while defining a space, in which piston-cylinder mechanisms 21 are housed. The web of beam 19 defines a contact surface for engaging support 3 while the web of beam 20 is facing downwardly towards the bottom of channel 7. Piston-cylinder mechanisms 21 may be connected to beams 19, 20 by suitable quick-coupling means. Arm 4 is displaceable to and fro in channel 7 by piston-cylinder mechanism 22, one end of which is by a horizontal pivot 23 connected to the lower part 20 of the arm adjacent the outer portion thereof. Piston-cylinder mechanism 22 projects through the space defined by beams 19, 20 and is at its other end by a horizontal pivot 24 connected to movable chassis part 18, more specifically the portion thereof limiting the extent of the channel towards one side of part 18. The underside of arm 4, i.e. the web of beam 20, may be provided with rolls or balls 25 for engaging the bottom surface of the channel.

Each arm 4 is provided with its own separate operating mechanism 22 for individually performing the displacement of said arm between the channels 7 of railroad car 1 and truck 2. Accordingly, only one arm may be used to transfer a small load unit or support 3 between the vehicles.

A bar 28 is associated to movable part 18 of truck 2. Bar 28 is movable to and fro in a guide 26 transversally in relation to truck 2 and arranged to compensate for pitching movements emanating from transfer of support 3. Bar 28 may be constructed of two tubular pieces 29, 30 having rectangular cross sections. Piece 30 is inserted into and connected to piece 29. Guide 26 consists of a cavity formed in chassis part 18. One end of a piston-cylinder mechanism 31 is connected to the bottom of said cavity. Said piston-cylinder mechanism projects within the spacing formed by pieces 29, 30 and the other end thereof is connected to piece 30 adjacent the outer end thereof. The outer end of piece 30 may be closed by an end wall. Piece 30 of bar 28 is by extension of piston-cylinder mechanism 31 insertable into a guide 32 of railroad car 1 so far that the outer edge of piece 29 abuts portions of railroad car 1 surrounding guide 32. The clearance between piece 30 and guide 32 and between piece 29 and guide 26 is comparatively small at least in vertical direction, so that bar 28 may compensate for pitching of the vehicles during transfer of support 3 and provide a stiff connection between the vehicles.

The bar 28 is provided with a pivotable hitch 33. Hitch 33 is designed like a lever with one arm provided with a claw and the other arm rotatably connected to a rod 34 projecting through an opening in bar 28. A helical spring 35 is arranged about rod 34 and acts between bar 28 and one end of said hitch and urges hitch 33 to a closing position. Rod 34 is rotatably connected to a guide disc 36 rotatably supported within bar 28. One end of a piston-cylinder mechanism 37 is connected to guide disc 36 and the other end thereof is connected to bar 28. Hitch 33 is arranged to co-operate with a locking shoulder on railroad car 1. Said locking shoulder comprises a portion defining a recess 38 located adjacent to guide 32 on railroad car 1 (FIG. 5). Hitch 33 has an inclined front surface 39, which abuts said locking shoulder and is pivoted away against action of spring 35 when inserting bar 28 into recess 32, said hitch engaging said locking shoulder when bar 28 is completely inserted while holding vehicles 1, 2 with a determined distance therebetween. In order to release hitch 33, piston-cylinder mechanisn 37 is retracted, thereby pivoting hitch 33 away from locking position against the action of spring 35.

Two sets of bars 28 and hitches 33 are provided on truck 2 and two corresponding sets of guides 32 and recesses 38 are provided on railroad car 1. Guides 32 and recesses 38 may also be arranged on the opposite side of railroad car 1 so as to enable transfer of support from said other side. Each bar 28 and guide 26 is provided underneath a channel 7 of truck 2 and each guide 32 and recess 38 are arranged underneath a channel 7 of railroad car 1.

In FIG. 9, part 19 of arm 4 is illustrated in an elevated position and a portion of railroad car 1 is illustrated with dashed lines. Bar 28 is inserted into the guide in railroad car 1 and arm 4 bridges the gap between truck 2 and railroad car 1 and is partially located within the channel in railroad car 1.

In FIG. 5, an indicator member 40 is diagrammatically illustrated on railroad car 1. On arm 4, (see FIG. 9) there is provided a sensing means (50) responsive to indicator member 40. Indicator member 40 and said sensing means are arranged in such a manner in relation to each other that when arm 4 has assumed a position on railraod car 1 suitable for elevating or lowering support 3, a signal is supplied to suitable operating means, which then interrupts pressure fluid supply to piston-cylinder mechanism 22. In this manner, support 3 is centered on railroad car 1. On truck 2, support 3 will be in correct position when arms 4 have been retracted as far as possible. Said sensing means and indicator member 40 may be of any suitable kind.

In order to determine the longitudinal position of chassis part 18 of truck 2 in relation to railroad car 1, two separate indicator members 41 are located thereon, two separate sensing members 51 on truck 2 being responsive to said indicator member. Indicator members 41 extend generally vertically. Said sensing members 50 and 51 may be of the optic, acoustic or electric type and indicator members 40 and 41 of such a material or construction that said sensing members are responsive thereto. For example, an optic sensing member may be of the so-called "electric eye" type (e.g. note Barber et al U.S. Pat. No. 3,765,692); an electric type sensor may comprise limit switches. Said sensing members 51 are connected to signal means to indicate to the operator of the device when said sensing members are aligned with indicator members 41 and thus truck 2 correctly positioned in relation to railroad car 1.

On railroad car 1, two further indicator members 42 are provided, to which said sensing members 51 are responsive. Indicator members 42 have a linear form and are arranged above indicator members 41 since part 18 of truck 2 normally is at a level below the railroad car and must be elevated to the level thereof. The two rear piston-cylinder mechanisms 49 may be controlled by the rear sensing member on part 18 whilst the front piston-cylinder mechanisms 49 may be controlled by the front sensing member. When elevation of part 18 has been initiated, elevation continues until either of said sensing members are in level with either of indicator members 42 and then the pressure fluid supply to the two piston-cylinder mechanisms 49 controlled by the sensing member in question is interrupted. Pressure fluid supply to the other piston-cylinder mechanisms continues until the other sensing member also is in level with the other indicator member 42. Thus, said sensing members are arranged to correctly position part 18 in relation to railroad car 1 in a vertical sense while co-operating with indicator members 42 and controlling piston-cylinder mechanisms 49.

Piston-cylinder mechanisms 15, 21, 22, 31, 37 and 49 on truck 2 are operated by pressure fluid from the pressure fluid system of truck 2. Piston-cylinder mechanisms 15 on railroad car 1 to operate hinches 14 may likewise be operated from the pressure fluid source of truck 2 and the latter comprises a quick-coupling means 43 of male type, which may be connected to a female coupling (not shown) on railroad car 1, said coupling communicating to piston-cylinder mechanisms 15. If indicator members 41, 42 need supply of electricity, said quick-coupling means 43 may be completed accordingly. Channels 7 in railroad car 1 have a width at least somewhat greater than the channels in truck 2 in order to eliminate seizure when transferring arms 4.

Support 3 may be completed in different ways. In FIG. 10, support 3 is provided with a reservoir 44 which is carried on support 3 by rests 45 connected thereto. In FIG. 11, support 3 is provided with two side walls 46 and two end walls 47 connected in a suitable manner to support 3. Other arrangements on support 3 are conceivable, such as poles for holding timber or other oblong objects. Support 3 may of course be completed to form a closed container having one or more doors. The device according to the invention is not limited to transfer of load units based upon a support 3 as described, but other arbitrary load units are possible e.g. load units having a smaller length.

Transfer of support 3 from railraod car 1 to truck 2 is carried out as follows: Truck 2 is driven to a parallel position to the side of railroad car 1, said sensing members, co-operating with indicator members 51 41, indicating to the driver of truck 2, e.g. on an instrument, when a correct longitudinal position has been assumed. Then part 18 of truck 2 is elevated by piston-cylinder mechanisms 49 until said sensing members co-operating with indicating members 42 on railroad car 1 have registered that the vehicles are in level, whereafter pressure fluid supply to piston-cylinder mechanisms 49 is interrupted. Quick-coupling means 43 on truck 2 is now, or possible already at an earlier stage, connected to the coupling on railroad car 1. Bars 28 are then displaced into guides 32 in railroad car 1, hitches 33 automatically engaging said locking shoulders on railroad car 1. Vehicles 1, 2 are now locked to each other. Arms 4 are then displaced from channels 7 of truck 2 to channels 7 of railroad car 1 by piston-cylinder mechanisms 22, said sensing means 50 on arms 4 interrupting said displacement as soon as said sensing means have reached indicator members 40 and the arms adopted a correct position in relation to railroad car 1. Pressure fluid is supplied to piston-cylinder mechanisms 15, thereby disengaging hitches 14 from support 3. Then support 3 is elevated by piston-cylinder mechanisms 21 acting on parts 19 of arms 4. Support 3 is elevated at least so that projections 12 on railroad car 1 disengage recesses 11. Then, double acting piston-cylinder mechanisms 22 retract arms 4 and support 3 to truck 2. When arms 4 are fully retracted onto truck 2, support 3 is lowered onto part 18 by contracting piston-cylinder mechanisms 21, projections 12 and hitches 14 of truck 2 automatically engaging corresponding recesses 11 and locking shoulders 13 on support 3. Subsequently, hitches 33 are disengaged from railroad car by piston-cylinder mechanisms 37, whereafter bars 28 are retracted into guides 26. Part 18 of truck 2 is then lowered to a transport position, in which part 18 rests on part 16, and quick-coupling means 43 is disengaged. Truck 2 may now be driven away with support 3 and the goods thereon to the destination. Transfer of support 3 from truck 2 to railroad car 1 is carried out in analogous manner.

Arms 4 and bars 28 are operated in synchronism when very long loads are transferred. When short loads or containers are to be transferred, it is possible to use only one of the arms 4 for the transfer.

To compensate for possible level differences between the vehicles by compression of the spring suspensions when transferring heavy loads, it is possible to continously control piston-cylinder mechanisms 49 by said sensing members continously co-operating with indicator members 42 so as to maintain a correct alignment of the vehicles.

The operations for transferring load units may be controlled automatically by a suitable control means apart from driving truck 2 into and out of position and possibly also connecting quick-coupling means 43.

The advantages of the invention are evident in that load units of very different sizes may be supported by chassis 5, 6 of the carriers. Since each arm 4 is provided with its own separate operating mechanism it is possible to use only one arm for transferring a short load unit from one carrier to the other and said load unit will under all circumstances be efficiently supported by said carriers.

The invention is obviously not limited to the embodiment described. Thus it is possible to use more than two arms 4 if necessary in view of the length of said carriers. In such a case it is possible to operate the arms individually or in groups comprising two or more arms depending upon the length of the load unit in view. The operating means for arms 4 may be modified so that arms 4 may be displaced to either sides of truck 2. Other drive means than piston-cylinder mechanisms 22 for arms 4 may be used. Instead of piston-cylinder mechanisms 49, support means connected to part 18 and arranged to contact the ground may be used, said support means having power means for elevating part 18 in relation to the ground. Piston-cylinder mechanisms 22 may be of multi-stage type when required by the length of displacement. In FIGS. 7 and 9 it has been indicated that piston-cylinder mechanisms 22 are of a two-stage type. The bottom surfaces of channels 7 may be inclined towards the sides of the carriers as illustrated with dashed lines in FIG. 9 to simplify transfer of arms 4. Said sensing members and indicating members may also be of a mechanical type.

What I claim is:

1. A device for transferring load units, comprising a transfer apparatus for transferring the load units in an elevated condition between first and second longitudinally extending carriers, said carriers having at least two upwardly open generally rectangular channels extending transversely to the longitudinal direction of said carriers, said channels being bridged by the load units when located on the carriers, said transfer apparatus being arranged on said second carrier and comprising at least two separate arms each having lifting means and being displaceable from the channels of said second carrier to the channels of said first carrier and vice versa transversely to the longitudinal direction of said carriers, said channels of said second carrier housing the arms when inactive in positions in which the arms extend transversely of said second carrier but not beyond the longitudinal sides thereof, each of said arms having a generally rectangular shape, as viewed from above, generally corresponding in size and shape to the rectangular shape of the channel therefor in the second carrier, loading platforms for the load units formed by supporting chassis of the carriers each comprising a plurality of partial load supporting platforms, said partial load supporting platforms on each of the carriers being located between and beside the channels recessed into said chassis and being rectangular as viewed from above, each of said partial load supporting platforms being formed by chassis portions extending in the longitudinal direction of the chassis between the sides of adjacent channels or between the ends of the chassis and the sides of the channels located adjacent thereto, and extending transversely of the longitudinal direction of the chassis from one longitudinal side of the chassis to the other, and each of said transfer arms being provided with its own separate operating mechanism for individually performing the displacement of said arm between the channels of the carriers.

2. Device according to claim 1, wherein a sensing means is arranged to sense when the arm has assumed a position of displacement in relation to one of said carriers suitable for lifting or lowering the load unit and to interrupt the displacement of the arm.

3. A device for transferring load units, comprising a transfer apparatus for transferring load units in an elevated condition between first and second carriers, said transfer apparatus being arranged on said second carrier and comprising at least two separate arms each having lifting means and being displaceable from said second carrier to said first carrier and vice versa, wherein at least one bar is associated with one of the carriers and movable to and fro in a guide, said bar being arranged to compensate for pitching forces during the transfer of the load units and being insertable into a corresponding guide in another carrier, said bar being associated with a hitch, which is spring-loaded to a locking position and arranged to be pivoted away by a lock shoulder when inserting the bar into the first carrier and engage with said lock shoulder when the bar is completely inserted while holding the carriers with a determined distance therebetween, said hitch being associated with operating means for disengaging the hitch while overcoming the spring force when the bar is to be retracted.

4. A device for transferring load units, comprising a transfer apparatus for transferring load units in an elevated condition between first and second longitudinally extending carriers, said transfer apparatus being arranged on said second carrier and comprising at least two separate arms each having lifting means and being displaceable from said second carrier to said first carrier and vice versa transversely to the longitudinal direction of said carriers, each of said arms comprising an upper part and a lower part, said parts having the form of U-shaped profiles, the flanges of which are facing towards each other and located in overlapping relationship while the bases of said profiles are generally planar and located in a parallel relationship, said flanges and bases of said profiles defining a central cavity extending along the full length of said profiles, said cavity housing at least one piston-cylinder mechanism acting between the bases of said profiles to elevate the upper profile in relation to the lower profile, the base of the upper profile being adapted to directly support a load unit in elevated condition, said cavity also housing at least one seond piston-cylinder mechanism to displace both of said profiles as a unit to and fro between the carriers, said second piston-cylinder mechanism having one end thereof hingedly connected to the lower profile of said arm about a generally horizontal axis and the other end thereof connected directly to the second carrier, said second piston-cylinder mechanism being generally completely located within the cavity of said profiles when they are fully retracted to the second carrier and at least partly located within the cavity of said profiles when they are displaced away from said second carrier.

5. Device according to claim 4, wherein at least two piston-cylinder mechanisms to elevate the upper profile are arranged within the cavity of the profiles and said second piston-cylinder mechanism extends between said two first mentioned piston-cylinder mechanisms.

* * * * *